United States Patent [19]

Taira et al.

[11] 4,395,538
[45] Jul. 26, 1983

[54] ADHESIVE FOR PRODUCTION OF METAL BOTTLES

[75] Inventors: Kazuo Taira, Tokyo; Akihiko Morofuji, Yokohama; Hiroshi Ueno, Yokosuka, all of Japan

[73] Assignee: Toyo Seikan Kaisha, Ltd., Tokyo, Japan

[21] Appl. No.: 416,479

[22] Filed: Sep. 10, 1982

[30] Foreign Application Priority Data

Sep. 17, 1981 [JP] Japan .............................. 56-145515

[51] Int. Cl.³ .............................................. C08G 63/02
[52] U.S. Cl. .................................. 528/272; 525/443; 528/302; 528/308.6; 523/100
[58] Field of Search ...................... 528/272, 302, 309; 525/443; 523/100

[56] References Cited

U.S. PATENT DOCUMENTS

| | | | |
|---|---|---|---|
| 3,890,279 | 6/1975 | Wolfe | 528/272 X |
| 3,959,200 | 5/1976 | Scott | 528/272 X |
| 4,072,661 | 2/1978 | Shipman | 528/272 X |
| 4,166,895 | 9/1979 | Buxbaum et al. | 528/272 |

*Primary Examiner*—Lucille M. Phynes
*Attorney, Agent, or Firm*—Sherman & Shalloway

[57] ABSTRACT

Disclosed is a metal bottle adhesive for lap-bonding upper and lower members, each consisting of a cup-like formed article of a metal, on the peripheral ends thereof, said adhesive comprising at least one high-molecular-weight thermoplastic resin having a post crystallinity $\Delta Wc$, defined by the following formula, of less than 20%:

$$\Delta Wc = Wc_{II} - Wc_I$$

wherein $Wc_I$ stands for the crystallinity (%) of the adhesive which has been molten at a temperature higher by 30° than the softening point thereof and then naturally cooled at room temperature, determined according to the density method, and $Wc_{II}$ stands for the crystallinity of the adhesive which has then been immersed in water maintained at 70° C. for 10 hours and then naturally cooled and dried at room temperature, determined according to the density method, a shear creep compliance $J(t)_{t=2\,hrs}$ of less than $10^{-4}$ cm²/hyne at 90° C. and a time constant of 2 hours and a concentration of

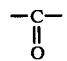

groups, contained in the main or side chain, of 10 to 1400 meq/100 g of the resin.

7 Claims, 4 Drawing Figures

Fig. 1
Fig. 2
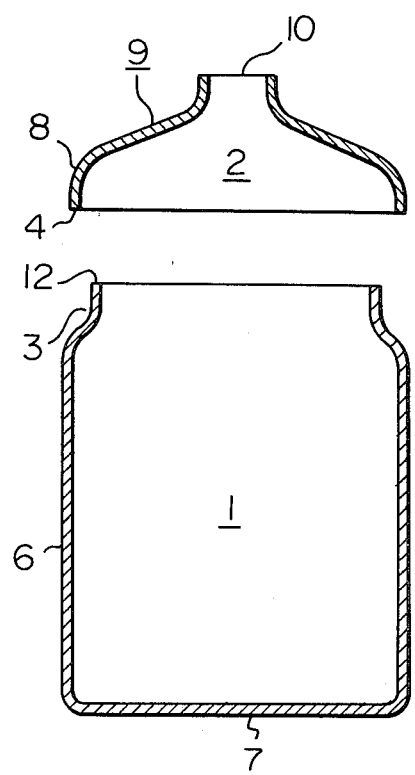
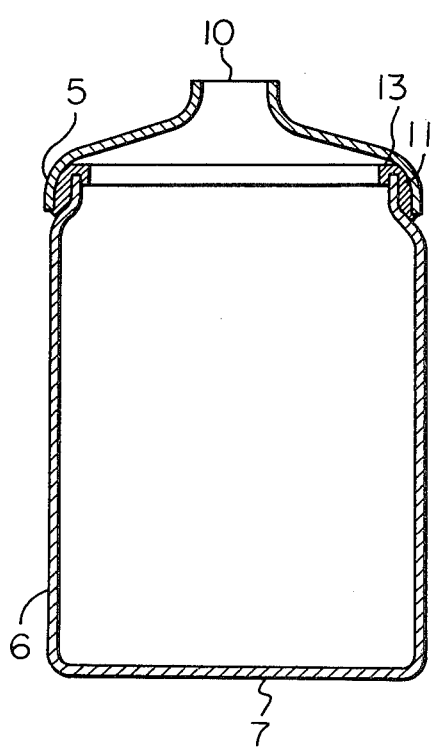

ADHESIVE FOR PRODUCTION OF METAL BOTTLES

BACKGROUND OF THE INVENTION

1. Field of the Invention

The present invention relates to an adhesive for production of metal bottles. More particularly, the present invention relates to an adhesive for lap-bonding upper and lower members, such consisting of cup-like formed article of a metal, on the peripheral ends thereof.

2. Description of the Prior Art

A bottle-shaped metal vessel formed by lap-bonding upper and lower members, such consisting of a cup-like formed article obtained by draw-forming or draw-ironing of a metallic material, on the circumferential open ends thereof to form a circumferential side seam, is advantageous over a so-called can-shaped metal vessel in various points.

In a conventional packaging metal vessel called "three-piece can", a sealing portion is formed by double-seaming lids to the top and bottom ends of a can body, and in another conventional packaging metal vessel called "two-piece can", a sealing portion is formed by double-seaming a lid to the open end of a cup-like can body obtained by draw-forming or draw-ironing of a metallic material.

In metal vessels having such a double-seam structure, however, the pressure resistance of the sealing portion is insufficient, and saving of the metallic material is a serious problem. More specifically, when a load is imposed on a seam formed by double seaming, the material constituting the seam is first deformed and leakage on the seam or fracture of the seam is readily caused by this deformation under a relatively small load. In order to prevent this leakage or fracture, it is necessary to use a material having a considerably large thickness. In packaging vessels, from the economical viewpoint and in order to reduce the vessel weight, it is always required to reduce the thickness of a metallic material. In the case where the thickness of a vessel wall is reduced, buckling is readily caused by a load applied in the axial direction of a vessel at preparatory steps such as the double seaming step and flanging step.

In case of a metal bottle obtained by lap-bonding upper and lower members, each consisting of a cup-like formed article, on the open ends thereof, even if the thickness of the seam-forming material is very small, deformation of the material is not caused on the seam at all and the seam can resist a load of up to the shear strength irrelevant to the thickness of the material. Furthermore, since the seaming step is not necessary, the thickness of the side wall of the vessel can be reduced without a risk of occurrence of buckling.

However, when a circumferential side seam is formed by lap-bonding upper and lower members on the open ends thereof, various restrictions are imposed on an adhesive used for lap bonding.

In case of a straight side seam of a can body formed by lap bonding, both the ends of the seam can be secured mechanically by double seaming to lids, but the above-mentioned circumferential side seam is not mechanically secured along the entire circumference and dimensional change or deformation of the seam is readily caused. Furthermore, since the diameter of the open end portion is going to change according to changes of the temperature, a stress is readily generated in the adhesive layer. Moreover, the thickness of the open end portion to be formed into a seam is often reduced, and the seam is often deformed by an external force. For these reasons, the adhesive to be used should have a high bonding force to a metallic material or a coating formed thereon, and the adhesive layer should have high mechanical strength and dimension stability and the properties of the adhesive layer should be stably either thermally or with the lapse of time.

SUMMARY OF THE INVENTION

In accordance with the present invention, there is provided a metal bottle adhesive for lap-bonding upper and lower members, each consisting of a cup-like formed article of a metal, on the peripheral ends thereof, said adhesive comprising at least one high-molecular-weight thermoplastic resin having a post crystallinity $\Delta Wc$, defined by the following formula, of less than 20%:

$$\Delta Wc = Wc_{II} - Wc_{I} \tag{1}$$

wherein $Wc_I$ stands for the crystallinity (%) of the adhesive which has been molten at a temperature higher by 30° than the softening point thereof and than naturally cooled at room temperature, determined according to the density method, and $Wc_{II}$ stands for the crystallinity of the adhesive which has then been immersed in water maintained at 70° C. for 10 hours and then naturally cooled and dried at room temperature, determined according to the density method, a shear creep compliance $J(t)_{t=2\ hrs}$ of less than $10^{-4}$ cm$^2$/dyne at 90° C. and a time constant of 2 hours and a concentration of

groups, contained in the main or side chain, of 10 to 1400 meq/100 g of the resin.

BRIEF DESCRIPTION OF THE DRAWINGS

FIG. 1 is a sectional view illustrating upper and lower members of the metal bottle of the present invention separately.

FIG. 2 is a sectional view showing the metal bottle of the present invention, which is formed by lap-bonding upper and lower members.

Figure 3:
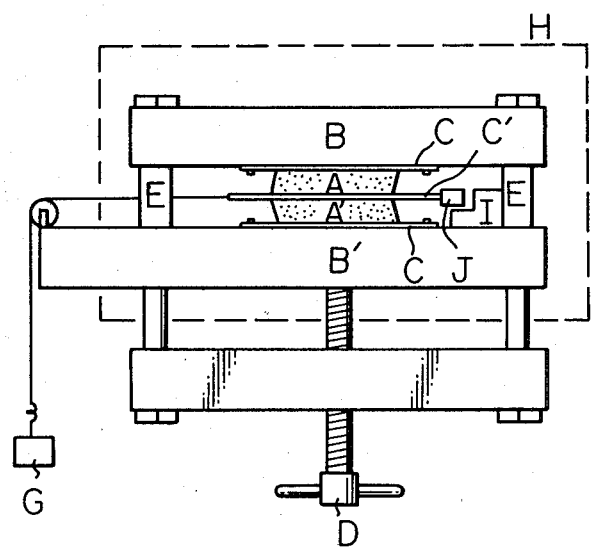
FIG. 3 is a diagram showing a measurement device to be used for the measurement of the shear creep compliance.

In the drawings, reference numerals 1, 2, 3, 4, 5, 6, 7, 9, 10, 11, 12 and 13 represent a lower member, an upper member, an open end portion, an open end portion, a side seam, a thin side wall portion, a bottom, a top wall, a pouring mouth, an adhesive, a cut end edge of a metallic material and a covering layer, respectively.

DETAILED DESCRIPTION OF THE PREFERRED EMBODIMENT

The present invention will now be described in detail.

One embodiment of a metal bottle is illustrated in FIGS. 1 and 2. This bottle comprises a lower member 1 consisting of a seamless cup-like formed article of a metal such as a tin-deposited steel plate and an upper member 2 consisting of a seamless cup-like formed article of a metal. These cup-like formed members are lap-bonded on open end portions 3 and 4 thereof to form a side seam 5, whereby these upper and lower members are integrated into a vessel.

In this embodiment, the lower member 1 is a cup comprising a tall, thin side wall portion 6 formed by highly draw-ironing a metallic material and a thick bottom portion 7 which has not substantially been ironed, and the upper member 2 is a cup comprising a short side wall portion 8 and a top wall 9, which are formed by shallow drawing of a metallic material. The height of the side wall portion 8 of the upper member 2 is equal to or slightly larger than the width of the seam 5. The top wall 9 of the upper member 2 has a convex tapered surface and a pouring mouth 10 for filling or discharging the content is formed in the central portion of the convex tapered surface of the top wall 9. Thus, upper member 2 is bonded in the form of a shoulder and neck of the bottle to the lower member 1.

In the embodiment illustrated in FIG. 1, the diameter of the open end portion 3 of the lower member 1 is reduced as compared with the diameter of the other side wall portion by necking performed in the vicinity of the open end portion 3, and this open end portion 3 is inserted in the open end portion 4 of the upper member, which has a larger diameter. An adhesive layer 11 is formed between the outer surface of the open end portion 3 of the lower member and the inner surface of the open end portion 4 of the upper member to effect bonding and securing of the upper and lower members. From the viewpoint of the corrosion resistance, it is preferred that a part of the adhesive layer 11 should protrude from the seam 5 to form a covering layer 13 for a cut edge of the metallic material located on the inner side of the seam.

One of important features of the present invention is that a high-molecular-weight thermoplastic resin having specific post crystallinity, shear creep compliance and

group concentration within the above-mentioned ranges is used as the adhesive 11 for the circumferential seam 5 formed by lap bonding.

The adhesive used should be a high-molecular-weight thermoplastic resin, particularly a crystalline, heat-fuse-bondable, thermoplastic resin. In a metal bottle having a circumferential side seam, to which the present invention is directed, the load imposed at the time of heat sterilization or during storage or transportation substantially acts as a shearing force on the adhesive. A high-molecular-weight thermopolastic resin is excellent in the mechanical properties such as tensile strength and flexural strength over adhesives composed of other resins, and this resin can resist a shearing force imposed on the adhesive layer and occurrence of degradation of the adhesion and reduction of the air tightness can be reduced even under severe conditions. Furthermore, since this thermoplastic resin is excellent in such properties as toughness and flexibility, even if a strain is caused on the adhesive layer by a stress and deformation is caused in the seam, fracture of the seam or leakage from the seam is prevented. Moreover, the bonding operation can be completed within a shorter time than in case of a thermosetting resin adhesive such as an epoxy resin or urethane resin for which a certain curing time is necessary. If a crystalline thermoplastic resin is used, the above-mentioned mechanical properties are further improved and a stronger seam can be obtained.

This thermoplastic resin is heat-fuse-bondable to a metallic material constituting the seam or a primer coating formed thereon. In order for the thermoplastic resin to be strongly bonded to the metallic material or primer coating, it is indispensible that the thermoplastic resin should contain polar groups at a certain concentration on the main or side chain. From this viewpoint, in the present invention a thermoplastic resin containing

groups (hereinafter referred to as "carbonyl groups") at a concentration of 10 to 1400 meq/100 g of the resin, preferably 12 to 1200 meq/100 g of the resin, on the main or side chain is used. These carbonyl groups are deviated from carboxylic acids, carboxylic acid salts, carboxylic anhydrides, carboxylic acid esters, carboxylic acid amides, ketones, carbonic acid esters, urea and urethane. The thermoplastic resin may be prepared by introducing a monomer having the above-mentioned functional group into the main chain of the polymer by such means as homopolymerization or copolymerization or by bonding such monomer to the thermoplastic polymer by graft polymerization or terminal treatment. Furthermore, a hydrocarbon polymer such as an olefin resin may be converted to a thermoplastic resin containing carbonyl groups at the above-mentioned concentration by subjecting the polymer to an oxidation treatment.

If the carbonyl group concentration is too low and below the above range, the adhesion or bonding strength to the seam-constituting material is insufficient, and if the carbonyl group concentration is too high and exceeds the above range, the adhesive layer becomes sensitive to moisture or water and the water resistance and hot water resistance of the seam are degraded. In the latter case, moreover, the cohesive force of the adhesive resin becomes too large, with the result that the heat-fuse-bonding operation is difficult or the toughness is lost. In the present invention, by adjusting the carbonyl group concentration of the polymer within the above-mentioned range, bonding force is highly improved, and the operation of applying the adhesive in the form of a film or the like to the bonding area and the operation of fusing the adhesive for bonding can remarkably be facilitated.

The thermoplastic resin adhesive of the present invention should have a post crystallinity, defined by the above formula (1), of less than 20%, especially less than 15%. The post crystallinity referred to in the instant specification has the following meaning.

In case of a certain crystalline thermoplastic polymer, it is observed that the crystallinity of the resin, which has been heated at a temperature above the melting point and then naturally cooled to room temperature, will often increase after holding at a temperature between the melting point and the glass transition temperature. A resin having such characteristics tends to have an increased crystallinity in the presence of water. For example, it sometimes is observed that if water is present, even at a temperature lower than the glass transition temperature, crystallinization is advanced. The post crystallinity $\Delta Wc$ represented by the above formula (1) is a parameter indicating the degree of the change of the crystallinity of the adhesive resin with an environmental change, that is, the stability of the crystallinity of the adhesive resin to the environmental change.

A metal bottle formed by using a thermoplastic resin adhesive is inevitably exposed to attack of a high temperature, though it is lower than the melting point of the resin, in the presence of water when a liquid content is hot-filled or the bottle filled with the content is heat-sterilized by hot water or hot steam or when the bottle is stored at a certain high temperature. If crystallization of the resin is advanced under these environmental conditions, the volume of the adhesive layer is changed and adhesion loss or loss of the air tightness is readily caused by the resultant internal strain. Furthermore, excessive increase in the crystallinity results in reduction of the mechanical strength of the adhesive layer or reduction of the toughness, flexibility or impact resistance.

In the present invention, by selecting and using a thermoplastic resin having a post crystallinity $\Delta Wc$ of less than 20%, especially less than 15%, adhesion loss of the seam or reduction of the physical properties of the adhesive layer per se under environmental changes can effectively be controlled.

In order to prevent breakage of a bottle body on filling of a content producing spontaneous pressure or at or after sterilization or to prevent leakage from the seam after the lapse of time, it is indispensable that the high-molecular-weight thermoplastic resin used in the present invention should have a shear creep compliance $J(t)_{t=2\ hrs}$ of less than $10^{-4}$ cm$^2$/dyne at 90° C. and a time constant of 2 hours. The shear creep compliance referred to in the instant specification has the following meaning.

Ordinarily, the shear creep compliance is a parameter indicating the quantity of deformation of a resin under a certain stress or load and is a reciprocal number of the elasticity indicating the hardness of the material.

When a gas-containing drink, which is a main material to be packed in a metal bottle, is filled, a shear stress is always imposed on the adhesive of the bonding area in the presence of an inner pressure. Accordingly, it is required that on sterilization of beer (up to 70° C.) or during storage of a carbonated drink (up to 50° C.), the adhesive layer should not be deformed or the dimension or shape of the vessel should not be changed.

It is known that in connection with the creep compliance, a time-temperature superposition principle is established under an ordinary stress. Namely, the creep compliance value obtained when a load is imposed for a short time at a high temperature is equal to the creep compliance value obtained when the load is imposed for a long time at a low temperature, and there present indefinite number of temperature-time combinations providing the same creep compliance value.

The inner pressure of a content to be filled in a metal bottle is within a range where the above-mentioned time-temperature superposition principle is established, and as higher inner pressures close to the critical level, there can be mentioned the inner pressure (7.5 Kg/cm$^2$) of a carbonated drink at 50° C., the inner pressure (about 6 Kg/cm$^2$) of beer at the sterilization step and the inner pressure (about 4 Kg/cm$^2$) of a nitrogen-filled soft drink at 90° C.

The constant defining the time-temperature superposition principle varies according to the kind of the thermoplastic resin, but at temperatures lower than the glass transition temperature and crystal-melting temperature, thermoplastic resins show a similar tendency and similar conversion curves which are downwardly convex are obtained when the logarithm of the time is plotted on the abscissa and the logarithm of the creep compliance is plotted on the ordinate.

If the creep compliance $J(t)_{t=2\ hrs}$ of the adhesive is less than $10^{-4}$ cm$^2$/dyne at 90° C. and a time constant of 2 hours, a sufficient dimension precision can be maintained at the above-mentioned nitrogen-filling of a soft drink, and in case of a carbonated drink stored at 50° C., a sufficient dimension precision can assuredly be maintained for more than 10 years when calculation is made according to the time-temperature superposition principle while adopting a maximum value.

The thermoplastic resin that is used in the present invention should have a sufficiently high molecular weight, and it is preferred that the number average molecular weight of the thermoplastic resin be at least 6000, especially from 9000 to 500,000. From the viewpoints of the heat-fuse-bondability and the adaptability to the heat-bonding operation, it is preferred that the thermoplastic resin should have a softening point (melting point) of 80° to 280° C., especially 90° to 240° C.

A thermoplastic resin satisfying the above-mentioned requirements is selected from heat-fuse-bondable resins and is used in the present invention. As such thermoplastic resin, there can be mentioned, in order of importance, polyesters, polyamides, ionomers (ion-crosslinked olefin copolymers), acid-modified polyolefins, vinyl ester copolymers and copolycarbonates, each of which satisfies the above-mentioned requirements, though thermoplastic resins that can be used in the present invention are not limited to those exemplified above.

Among polyesters, polyethylene terephthalate is not suitable for attaining the objects of the present invention because the post crystallinity $\Delta Wc$ of polyethylene terephthalate is higher than 20% and adhesion loss of the bonded portion due to environmental changes is prominent. Most of polyester type hot-melt adhesives have a shear creep compliance $J(t)_{t=2\ hrs}$ exceeding the range specified in the present invention and too low a molecular weight, and therefore, they are not suitable for attaining the objects of the present invention.

As preferred examples of the polyester that can be used in the present invention, there can be mentioned high-molecular-weight copolyesters containing terephthalic acid units and other dibasic acid units as the dibasic acid component and tetramethylene glycol units as the diol component and high-molecular-weight copolyesters containing benzene-dicarboxylic acid units as the dibasic acid component and tetramethylene glycol units and other diol units as the diol component. For example, there can be mentioned polytetramethylene terephthalate/isophthalate, polytetramethylene terephthalate/isophthalate/adipate, polytetramethylene terephthalate/adipate, polytetramethylene terephthalate/sebacate, polytetramethylene/ethylene terephthalate, polytetramethylene/polyoxyethylene terephthalate and polytetramethylene/polyoxyethylene terephthalate/isophthalate.

These copolyesters may be used singly or in the form of a blend of two or more of them or a blend with a polyolefin resin such as polyethylene, polypropylene, an ionomer, an ethylenevinyl acetate copolymer or modified polypropylene.

Among polyamides, most of dimeric acid-based hot-melt adhesives are not suitable for attaining the objects of the present invention because the shear creep compliance is outside the range specified in the present invention. In the present invention, at least one nylon containing 4 to 12 amide groups per 100 carbon atoms is preferably used as the polyamide type adhesive. For example, there can be mentioned poly-ω-aminodecanoic acid, poly-ω-aminoundecanoic acid, poly-ω-aminododecanoic acid, poly-ω-aminotridecanoic acid, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene axelamide, polydecamethylene azelamide, polydodecamethylene azelamide and polytridecamethylene azelamide.

These polyamides may be used in the form of a blend of two or more of them, a copolyamide of the constituent monomers or a mixture thereof. The polyamide used may be modified with a different component such as a dimeric acid, if the degree of modification is low.

As the ionomer, there can be used resin obtained by neutralizing copolymers of olefins with unsaturated carboxylic acid and optionally with other vinyl monomers by an alkali metal, an alkaline earth metal or an organic base, for example, Surlyns marketed by Du Pont Co., U.S.A.

Furthermore, there can be used acid-modified polyolefins obtained by grafting an ethylenically unsaturated carboxylic acid such as acrylic acid, methacrylic acid or crotonic acid or an ethylenically unsaturated carboxylic anhydride such as maleic anhydride or itaconic anhydride to a polyolefin such as polyethylene, polypropylene or a crystalline ethylene-propylene copolymer. Moreover, as the vinyl ester copolymer, there can be used copolymers of vinyl esters with olefins or other vinyl monomers and partial saponification products thereof, such as an ethylene/vinyl acetate copolymer, a partially saponified ethylene/vinyl acetate copolymer and a vinyl chloride/vinyl acetate copolymer.

Known additives such as fillers, ultraviolet absorbers, stabilizers, lubricants, antioxidants, pigments, dyes and antistatic agents may be incorporated into the foregoing resins according to the known recipes.

As the metallic material to be formed into a seamless cup, there can be used an untreated steel plate (black plate), steel plates subjected to various surface treatments such as a tin-deposited steel plate (tin-plate), a zinc-deposited steel plate, an aluminum-deposited steel plate, a nickel-deposited steel plate and a chromium-deposited steel plate, electrolytically treated steel plates such as an electrolytically chromic acid-treated steel plate, chemically treated steel plates such as a steel plate treated with phosphoric acid and/or chromic acid, plates of light metals such as aluminum, and composite materials thereof.

A seamless cup is ordinarily obtained by punching a metallic material such as mentioned above into a disc, subjecting the disc to the single-stage or multi-stage drawing operation between a drawing punch and a drawing die, and if desired, subjecting the drawn cup to the multi-stage ironing operation between an ironing punch and an ironing die. The procedures and conditions of these drawing and ironing operations are known, and these operations may be carried out under known conditions.

The thickness of the metallic material to be processed varies according to the final dimension of the bottle and the kind of the material, but the thickness is ordinarily 0.2 to 0.5 mm, preferably 0.2 to 0.35 mm. When the metallic material is ironed, it is preferred that the ironing operation be carried out so that the thickness of the side wall portion is 0.05 to 0.20 mm, especially 0.06 to 0.17 mm.

Prior to formation into a cup, the metallic material is covered with an anti-corrosive protecting coating, or a formed cup is subjected to trimming and if necessary, a pickling treatment, for example, a chemical surface treatment with phosphoric acid and/or chromic acid is performed, and an anti-corrosive protecting paint is applied at least to the inner surface. As the protecting paint, there can be used optional paints comprising thermoplastic resins, for example, modified epoxy paints such as phenol-epoxy paints and amino-epoxy paints, vinyl and modified vinyl paints such as vinyl chloride-vinyl acetate copolymer paints, partially saponified vinyl chloride-vinyl acetate copolymer paints, vinyl chloride-vinyl acetate-maleic anhydride copolymer paints, epoxy-modified vinyl resin paints, epoxyamino-modified vinyl resin paints and epoxyphenol-modified vinyl resin paints, and synthetic rubber paints such as styrene-butadiene copolymer paints.

These paints are applied in the form of an organic solvent solution each as an enamel or lacquer or an aqueous solution or dispersion to cups by spray coating, dip coating, electrostatic coating or electrophoretic coating. Of course, when a thermosetting resin paint is used, the formed coating is baked if necessary.

The adhesive of the present invention is applied to open end portions of cups to be bonded before the cups are assembled at both end edges. It is preferred that the adhesive be applied so that the thickness of the resin layer is 10 to 200 μm, especially 20 to 150 μm, and the width of the lap-bonded portion, that is, the lap width, is 1 to 30 mm, especially 2 to 20 mm.

The adhesive resin may be applied to the cups in various forms, for example, a film, a powder, a slurry, a solution, a plastisol and an emulsion. The adhesive of the present invention is especially advantageous in that it can be applied in the form of a film which is easy to handle, coat and dry.

For application of the adhesive, an optional method can be adopted according to the form of the adhesive. For example, there may be adopted a lamination method, an extrusion method, an electrostatic powder coating method, an electric deposition coating method, a spray coating method, a nozzle extrusion method, a dip coating method, a roll coating method and a brush coating method.

When a protecting paint such as mentioned above is applied to the portion to be bonded of the metallic material, the paint acts as the primer to the adhesive, and a desirable bondability is obtained. Of course, a paint acting as a primer may be applied to the metallic material prior to application of the adhesive.

When circumferential open end portions of cups are lap-bonded, a cut edge of the metallic material is inevitably exposed to the inner side of the seam. This cut edge may be wrapped with an adhesive tape or coated with a powder, slurry or solution of the adhesive prior to fitting of the cups so as to protect the cut edge.

The adhesive may be applied to the outer or inner face of the open end portion of the cup, which is to be formed into an inner or outer side of the resulting seam, or to both the outer and inner faces.

the other cup is fitted onto the adhesive-applied cup, the adhesive present in the portion to be lap-bonded is molten and, if necessary, the formed seam is cooled. Heating of the lap portion may be accomplished by high frequency induction heating, infrared ray heating, hot air heating and conduction of heat from a heating element. Cooling of the seam may be accomplished by optional means, for example, natural cooling, air cooling or water cooling.

In order to form a seam excellent in the air tightness and bonding force, it is preferred that the adhesive be molten in the state where the adhesive layer is pressed and held between the open end portions to be formed into the outer and inner sides of the resulting seam. Furthermore, it is generally preferred that in both the open end portions forming the circumferential lap bonding, the outer diameter $D_I$ of the open end portion located on the inner side and the inner diameter $D_O$ of the open end portion located on the outer side should satisfy the requirement of $D_O - D_I < 2d_A$ in which $d_A$ stands for the thickness of the adhesive layer interposed between both the open end portions before bonding, and that the thickness of the adhesive layer after bonding be 10 to 150 μm, especially 10 to 100 μm.

If the open end portion located on the outer side is expanded by heating or the open end portion located on the inner side is mechanically compressed when the two cups are assembled at both end edges, assembling can be facilitated.

The bottle prepared according to the present invention is especially valuable as a vessel for a content having a spontaneous pressure, such as a carbonated drink, beer or a bubbling spirit, or as an inner pressure vessel in which a content is filled together with liquefied nitrogen or the like.

A metal bottle obtained by using the adhesive of the present invention is prominently advantageous in various points over conventional plastic bottles (blow-molded polyethylene terephthalate bottles) and glass bottles. These advantages are summarized in the following Table A.

TABLE A

|  | Metal Bottle (prepared by using adhesive of present invention) | Plastic Bottle (PET) | Glass Bottle |
|---|---|---|---|
| Light Weight (handling property) | ⊚ | ⊚ | X |
| Falling Strength | ⊚ | O | X |
| Dimension Stability (heat-resistant, pressure-resistant creep characteristic) | ⊚ | X |  |
| Gas Barrier Property | ⊚ | Δ | ⊚ |
| Light Screening Property | ⊚ | Δ | Δ |
| Manufacturing Speed | ⊚ | Δ | Δ |
| Content Cooling Speed | ⊚ (prominent as volume is large) | X | Δ |
| Easy Crushing Property | O | X | X |

The present invention will now be described in detail with reference to the following Examples.

The physical properties of the thermoplastic adhesives were determined according to the methods described hereinafter. Incidentally, since the physical significances of these properties are definite, the physical properties may be determined according to methods other than those described hereinafter, and the measurement methods are not particularly critical.

[Measurement of Physical Properties of Adhesives]

(A) Measurement of Post Crystallinity ΔWc by Density Gradient Tube

A lap-bonded portion was cut out from a metal bottle, and the adhesive film was collected by dissolving the plate portion in an acid such as dilute hydrochloric acid or dilute nitric acid. A part of the adhesive film was dipped in water maintained at 70° C. for 10 hours. The film was sufficiently dried for 48 hours in an atmosphere maintained under a pressure of $10^{-4}$ mmHg at 20° C. by a vacuum drier provided with a liquefied nitrogen trap to obtain a sample for determination of the density. The sample obtained from the film just after collection from the lap-bonded portion was designated as "sample I" and the sample obtained from the film which had been subjected to the dipping treatment was designated as "sample II".

A direct-reading type specific gravity-measuring device supplied by Ikeda Rika was used as the density gradient tube, and an appropriate density gradient liquid was chosen according to the kind of the adhesive resin so that influences due to dissolution and swelling were not produced and an appropriate density range could be obtained. A sample cut into a size of about 1.0 cm × about 0.3 cm was thrown into the density gradient tube at 20° C. and after passage of 5 hours, the density was determined from the position of the sample. The post crystallinity was determined according to the following procedures.

In many cases, it was difficult to peel the primer coating from the adhesive film. Accordingly, the amount $W_p$ of the primer adhering to the adhesive layer was determined from the known amount of the coated primer, and the density $\rho_p$ of the primer was independently determined in the same manner as described above by using the density gradient tube. The true density $\rho_A$ of the adhesive was determined from the density $\rho_p$ of the primer and the apparent density $\rho$ of the sample according to the following formula:

$$\frac{W_A + W_p}{\rho} = \frac{W_A}{\rho_A} + \frac{W_p}{\rho_p} \qquad (2)$$

In the above formula (2), $W_A$ stands for the weight of the adhesive in the sample.

The crystallinities $W_I$ and $W_{II}$ (%) of the sample were determined from the so-determined true density $\rho_A$ by using the density $\rho_c$ of the crystalline portion of the adhesive resin and the density $\rho_a$ of the amorphous portion of the adhesive resin according to the following formula:

$$\frac{100}{\pi_A} = \frac{Wc}{\rho_c} + \frac{Wa}{\rho_a} \qquad (3)$$

$$Wc + Wa = 100$$

The post crystallinity ΔWc of the adhesive was determined from the crystallinity $Wc_{II}$ of the sample II and the crystallinity $Wc_I$ of the sample I according to the formula (1).

With respect to each adhesive, samples were collected from three bottles, and the measurement was carried out on the respective samples and an arithmetic mean value was calculated.

(B) Measurement of Shear Creep Compliance

An apparatus capable of measuring the simple shear as shown in FIG. 3, which is similar to the apparatus disclosed by K. E. van Holde and J.W. Williams, J. Polym. Sci., 11, 243 (1955), was used for the measurement.

Two film-like test pieces A and A' of the adhesive having an area a and a thickness d were sandwiched by three electrolytically chromium-treated steel plates C and C' having a thickness of 0.10 mm. The upper and lower steel plates C were secured to discs B and B' by screws and the intermediate steel plate C' was connected to a piano wire through a clamp. The adhesive films were heat-fuse-bonded to the steel plates, or the adhesive films were completely bonded to the steel plates by an instantaneous adhesive so that slip was not caused. A spacer E was selected so that it was well conformed to the entire thickness of the steel plates and films, and the entire assembly was loosely secured by a screw D. The portion, surrounded by a broken line, of the apparatus was enclosed and maintained at a constant temperature of 90° C. After passage of at least 30 minutes from the point of arrival of the temperature at the constant level, a weight G was connected to the top end of the piano wire and the creep test was started. The configurations (area a and thickness d) of the sample and the weight W of the load were selected within ranges of $a = 1$ to 25 cm$^2$, $d = 0.05$ to 1.00 cm and $W = 0.05$ to 20 Kg so that a highest measurement precision could be obtained. The displacement during period of 2 hours from the point of application of the load, that is, the change of the distance between I and J, was measured by a cathetometer.

The shear creep compliance J(t) (cm$^2$/dyne) was calculated from the displacement $\Delta x(t)$ (cm) and the load F (dyne) according to the following formula:

$$J(t) = \frac{2a}{dF} \Delta x(t) \quad (4)$$

In the Examples described hereinafter, metal bottles were evaluated according to the following methods.

[Evaluation of Metal Bottles]

(A) Measurement of Shear Strength of Bonded Portion

Sample pieces having a length of 7 cm in the direction of the height and a length of 2 cm in the circumferential direction and including a bonded portion were collected from a metal bottle just after bonding and a metal bottle which had been allowed to stand at 70° C. for 10 hours in the water-filled state and then dried in vacuo. The shear test was carried out at a pulling speed of 100 m/min at room temperature by using a Tension tester, and the shear strength was determined while the bonded area of the lap-bonded portion was taken into account. With respect to each adhesive, the measurement was conducted on three bottles and an arithmetic mean value was calculated. The shear strength above 55-57 kg/cm$^2$ appearing in Table 1 indicates the breakdown of base metal, and the actual lap shear strength is usually larger than that.

(B) 3 Months' Storage Test at 50° C.

(i) Change of Volume

The total volume of the bottle before filling was measured, and a content was filled in the bottle and the bottle was stored at 50° C. for a predetermined time. With respect to the bottle where no leakage was observed, the total volume was measured again to determine the volume change $\Delta V$. With respect to each adhesive, 10 bottles were tested and an arithmetic mean value was calculated.

(ii) Leakage and Body Breakage Ratios

Bottles where the upper member was separated from the bottom member or either of the two members was deformed to form a space in the bonded portion were judged as body-broken bottles. Bottles where the inner pressure at 25° C. was reduced by more than 5% from the inner pressure just after filling or bleeding of the content was observed in the vicinity of the bonded portion were judged as leakage bottles. The ratio (%) of the total number of leakage bottles and body-broken bottles to 50 tested bottles was calculated and shown. Incidentally, the parenthesized value indicates the ratio (%) of the body-broken bottles.

(C) Denting Test

Figure 4:
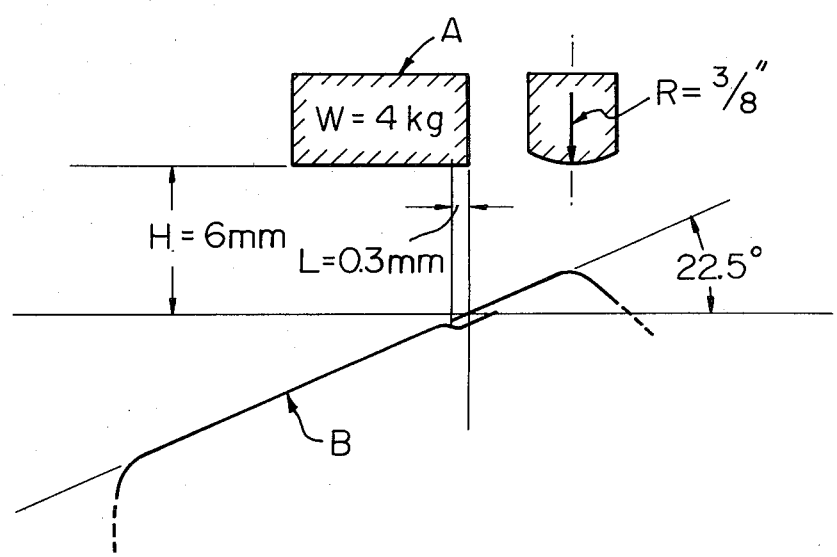
FIG. 4 is a view diagrammatically illustrating the denting test.

A metal bottle was filled with a predetermined content, and as shown in FIG. 4, a 4-Kg weight A was let to naturally fall down vertically onto the metal bottle B at a position 0.3 mm from the edge of the outer member of the bonded portion of the metal bottle inclined by 2.5° to the horizontal direction from a certain height (6 mm).

At this test, bottles where the upper member was separated from the bottom member or a space was formed between the two members were judged as body-broken bottles, and bottles where the inner pressure measured after 48 hours' standing at 25° C. was reduced by at least 5% from the pressure measured before standing or bleeding of the content was observed in the vicinity of the bonded portion were judged as leakage bottles. The ratio (%) of the total number of the body-broken bottles and leakage bottles to the number of the tested bottles is shown as the leakage ratio, and each of the parenthesized values indicates the ratio (%) of the body-broken bottles.

The test was carried out at 0° C. and 25° C., and 50 bottles were tested after arrival of the test temperature had been confirmed.

EXAMPLES 1 AND 2 AND COMPARATIVE EXAMPLE 1

A modified vinyl paint was coated and baked on the inner and outer surface of an aluminum plate (H 19 of material 3004) having a thickness of 0.23 mm so that coated amounts were 150 mg/dm$^2$ and 60 mg/dm$^2$, respectively. The coated aluminum plate was punched into a disc having a diameter of 94 mm and subjected to an ordinary press forming treatment to form an upper member including a bonded portion having an end edge inner diameter of 64.45 mm and having a pouring mouth having a diameter of 25 mm in the central portion.

Separately, an aluminum plate (H 19 of material 3004) having a thickness of 0.30 mm was punched into a disc having a diameter of about 142 mm and formed into a cup having an inner diameter of about 85 mm between a drawing punch and a drawing die. The cup was subjected to the re-drawing operation and was then subjected to the ironing operation by an ironing punch having a diameter of about 66.1 mm and a die. A modified vinyl paint was coated on the outer surface by a mandrel coater so that the amount of the coating was 60 mg/dm², and the coating was baked. Then, the same paint was spray-coated on the inner surface of the cup so that the amount of the coating was 150 mg/dm², and the coating was baked. The coated cup was subjected to the necking operation to form a lower member in which the outer diameter of the circumferential edge was 64.40 mm.

An adhesive described below was coated on the entire circumference of the edge of the lower member on the outer surface side thereof along a width of about 4 mm in the following manner. In Example 1, a powder having a particle size of about 25 μm, which was composed of a copolyester A of polytetramethylene terephthalate (PBT)/polytetramethylene isophthalate (PBI) having a PBT/PBI copolymerization ratio of 70/30 was used as the adhesive and electrostatically coated in a film thickness of about 30 μm, and the coated adhesive was heated by an infrared ray heater to form a film. In Example 2, a film having a thickness of 30 μm, which was composed of a copolyester blend A comprising a copolyester of polyethylene terephthalate (PET)/polyethylene isophthalate (PEI) having a PET/PEI copolymerization ratio of 80/20 and a copolyester of PBT and PBI having a PBT/PBI copolymerization ratio of 65/35 [(PET/PEI)/(PBT/PBI) blend ratio=3/7], was bonded to the edge of the outer surface of the lower member which had been heated in advance by high frequency induction heating. In Comparative Example 1, a polyethylene terephthalate film having a thickness of 30 μm was bonded in the same manner as described above.

The upper member and the adhesive-applied lower member were assembled at both end edges and the assembled portion was heated by high frequency induction heating to melt the adhesive and the melt was cooled and solidified to form a metal bottle having a volume of about 500 ml, which comprised the bonded upper and lower members.

With respect to each of the so-obtained metal bottles, the shear strength of the bonded portion was measured just after bonding and after 10 hours' standing at 70° C. in the water-filled state. Furthermore, the bottle was filled with cola, the pouring mouth was plugged, sterilization was carried out at 42° C. by a can warmer, the filled bottle was allowed to stand at 50° C. for 3 months, and occurrence of leakage or body breakage was checked. The obtained results and physical properties of each adhesive are shown in Table 1.

TABLE 1

| | | | Adhesive | | | | | | Shear Strength (Kg/cm²) | | |
|---|---|---|---|---|---|---|---|---|---|---|---|
| | Kind | Form | Softening Point (°C.) | Post Crystallinity ΔWc (%) | Shear Creep Compliance J(t) t = 2 hrs (cm²/dyne) | Number Average Molecular Weight (Mn × 10⁻⁴) | $-\overset{O}{\underset{\|}{C}}-$ Group Concentration (meq/ 100 g) | Just After Bonding | After 10 hours' Standing at 70° C. in Water-Filled State | 3 Months' Standing at 50° C. Leakage (Body Breakage) Ratio (%) |
| Example 1 | copolyester A | powder | 180 | 5 | 2.3 × 10⁻⁶ | 2.5 | 909 | >55 | >56 | 0 |
| Example 2 | copolyester blend A | film | 175 | 15 | 3.6 × 10⁻⁶ | 2.7 (average) | 950 | >57 | >55 | 0 |
| comparative Example 1 | polyethylene terephthalate | film | 266 | 23 | 3.8 × 10⁻⁷ | 2.5 | 1042 | 53 | 24 | 46 (30) |

EXAMPLES 3 AND 4 AND COMPARATIVE EXAMPLE 2

A modified vinyl paint was coated and baked on the inner and outer surfaces of an aluminum plate (H 19 of material 3004) having a thickness of 0.23 mm so that the coating amounts were 180 mg/dm² and 80 dm², respectively. The coated aluminum plate was punched into a disc having a diameter of 250 mm and subjected to a customary press forming operation to form an upper member in which the inner diameter of the end edge of the bonded portion was 110.6 mm and a pouring mouth having a diameter of 30 mm was formed in the central portion.

A disc having a diameter of 250 mm was formed from the same coated aluminum plate by punching and was subjected to a press forming operation to prepare a lower member in which the outer diameter of the end edge of the bonded portion was 110.6 mm.

An adhesive described below was coated on the entire circumference of the end edge of the lower member along an outer face side width of about 6 mm and an inner face side width of 2 mm in the following manner. In Example 3, a film having a thickness of 80 μm and a width of 8 mm, which was composed of a copolyester B comprising as the dibasic acid component terephthalic acid and isophthalic acid at a molar ratio of 8/2 and as the glycol component tetramethylene glycol and triethylene glycol at a molar ratio of 20/1, was bonded on the entire circumference of the end edge of the outer surface of the lower member which had been heated in advance by high frequency induction heating, so that the film edge protruded from the entire circumference by about 2.5 mm. Then, the end edge was heated again by high frequency heating and the protruding portion of the film was folded back by a roll and bonded to the inner surface side to form a lower member having the end edge covered with the adhesive. In Example 4, a nylon 11 powder having an average particle size of 35 μm was electrostatically coated on the lower member while it was masked so that the end edge was exposed along 6 mm on the outer surface side and along 2 mm on the inner surface side, and the powder was molten by an infrared ray heater to form an adhesive film having a thickness of about 85 μm. In Comparative Example 2, a polyamide A obtained by condensing and polymerizing dimeric acid, polyalkylene polyamide and hexamethylene diamine was coated in a thickness of about 80 μm in the above-mentioned form by using a hot melt applicator provided with a gear pump.

The upper member and the adhesive-coated lower member were assembled at both end edges, and the assembled portion was heated by high frequency induction heating and the adhesive was molten. The melt was cooled and solidified to form a metal bottle having a volume of about 2 liters, which was composed of the bonded upper and lower members.

Each of the so-obtained metal bottles was filled with beer, the pouring mouth was plugged, sterilization was carried out at 65° C. for 30 minutes and the filled bottle was allowed to stand at 50° C. The change of the volume or occurrence of leakage or body breakage was checked. The obtained results and physical properties of the adhesives are shown in Table 2.

the following manner. In Example 5, a film having a thickness of 50 μm and a width of 6 mm, which was composed of a copolyester blend B comprising a PET/PEI copolyester (PET/PEI molar ratio=80/20), a PBT/PBI copolyester (PBT/PBI molar ratio=64/35) and low-density polyethylene (LDPE) at a blend ratio of 2.5/6.5/1, was applied to the entire circumference of the end edge of the outer surface of the lower member which had been heated in advance by high frequency induction heating, so that the film protruded along about 2 mm. The protruding portion of the film was folded back and bonded to the inner surface side to form a lower member having the end edge covered with the adhesive. In Example 6, a maleic anhydride-modified polypropylene powder having an average particle size of 30 μm was electrostatically coated on the lower member while the lower member was masked so that

TABLE 2

| | | | Adhesive | | | | | 3 Months' Standing at 50° C. | |
|---|---|---|---|---|---|---|---|---|---|
| | Kind | Form | Softening Point (°C.) | Post Crystallinity ΔWc (%) | Shear Creep Compliance J(t) t = 2 hrs (cm²/dyne) | Number Average Molecular Weight (Mn × 10⁻⁴) | $-\overset{O}{\underset{\|}{C}}-$ Group Concentration (meq/100 g) | Volume Change ΔV (ml) | Leakage (Body Breakage) Ratio (%) |
| Example 3 | copolyester B | film | 182 | 2 | $5.2 \times 10^{-6}$ | 2.1 | 890 | 0.05 | 0 |
| Example 4 | nylon 11 | powder | 188 | 11 | $9.2 \times 10^{-7}$ | 1.8 | 546 | 0.04 | 0 |
| Comparative Example 2 | polyamide A | hot melt | 165 | 0 | $3.2 \times 10^{-4}$ | 0.6 | 286 | 2.5 | 16 (4) |

EXAMPLES 5 THROUGH 7 AND COMPARATIVE EXAMPLE 3

An epoxy-urea paint was coated and baked on the inner and outer surfaces of a bright tin-deposited steel plate (T-1, plated amount=#50/50) having a thickness of 0.23 mm so that the coating amounts were 150 mg/dm² and 60 mg/dm², respectively, and the coated plate was subjected to a customary press forming operation to form an upper member in which the inner diameter of the end edge of the bonded portion was 64.48 mm and a pouring mouth having a diameter of 25 mm was formed in the central portion.

Separately, a tin-deposited steel plate having a thickness of 0.30 mm was punched into a disc having a diameter of about 142 mm and formed into a cup having an inner diameter of about 85 mm between a drawing punch and a drawing die. Then, the cup was subjected to a re-drawing operation and was ironed by an ironing punch having a diameter of about 66.1 mm and a die. A modified epoxy paint was coated and baked on the outer surface of the cup by means of a mandrel coater so that the coating amount was 60 mg/dm². Then, an epoxy-urea resin was spray-coated and baked on the inner surface so that the coating amount was 150 mg/dm². The coated cup was subjected to a necking operation to form a lower member in which the outer diameter of the circumferential end edge was 64.40 mm.

An adhesive described below was coated on the entire circumference of the end edge of the lower member along a width of about 4 mm on the outer surface side and a width of about 2 mm on the inner surface side in the end edge was exposed by 4 mm on the outer surface side and by 2 mm on the inner surface side. The powder was molten by a hot air oven to form an adhesive layer having a thickness of about 50 μm. In Example 7, the lower member was inclined by about 70° C. to the vertical direction and while the lower member was being turned, a part of the end edge was immersed in a 30% solution of a vinyl chloride-vinyl acetate copolymer having a vinyl chloride/vinyl acetate ratio of 8.5/1.5. The solvent was evaporated by a hot air oven and the resin was molten to form an adhesive layer of the above-mentioned shape having a thickness of about 50 μm. In Comparative Example 3, an acrylonitrile/butadiene/styrene block copolymer powder having an acrylonitrile/butadiene/styrene ratio of 4/2/4, which had an average particle size of 20 μm, was coated in a thickness of about 50 μm on the end edge portion in the same manner as in Example 6.

The upper member and the adhesive-coated lower lower member were assembled at both end edges, and the assembled portion was heated by high frequency induction heating to melt the adhesive. The melt was cooled and solidified to form a metal bottle having a volume of about 500 ml, which was composed of the bonded upper and lower members.

Each of the so-obtained metal bottle was filled with cola, the pouring mouth was plugged, sterilization was carried out at 42° C. by a can warmer and the standing test was conducted at 50° C. Then, the denting test was carried out at 0° C. and 25° C. to evaluate the strength. The obtained results and physical properties of the adhesives are shown in Table 3.

TABLE 3

| | Kind | Form | Adhesive Softening Point (°C.) | Post Crystallinity ΔWc (%) | Shear Creep Compliance J(t) t = 2 hrs (cm²/dyne) | Number Average Molecular Weight (Mn × 10⁻⁴) | $-\overset{\overset{\displaystyle O}{\|}}{C}-$ Group Concentration (meq/100 g) | 3 Months' Standing at 50° C. Leakage (Body Breakage) Ratio (%) | Denting Test Leakage (Body Breakage) Ratio (%) 0° C. | 25° C. |
|---|---|---|---|---|---|---|---|---|---|---|
| Example 5 | copolyester blend B | film | 170 | 12 | 4.3 × 10⁻⁵ (average) | 1.7 | 851 | 0 | 0 | 0 |
| Example 6 | maleic anhydride-modified polypropylene | powder | 165 | 3 | 4.8 × 10⁻⁷ | 2.7 | 16 | 0 | 0 | 0 |
| Example 7 | vinyl chloride/vinyl acetate copolymer | solution | 105 | 1 | 6.5 × 10⁻⁵ | 2.6 | 174 | 0 | 0 | 0 |
| Comparative Example 3 | ABS resin | powder | 135 | 0 | 7.3 × 10⁻⁵ | 4.6 | 0 | 42 (28) | 82 (66) | 32 (10) |

EXAMPLES 8 and 9 AND COMPARATIVE EXAMPLE 4

An epoxy-phenol paint was coated and baked on the inner and outer surfaces of an electrolytically chromic acid-treated steel plate (T4CA) having a thickness of 0.23 mm so the coating amounts were 180 mg/dm² and 60 mg/dm², respectively, and the coated plate was punched into a disc having a diameter of 94 mm and was subjected to a customary press forming operation to prepare an upper member in which the inner diameter of the end edge of the bonded portion was 64.50 mm and a pouring mouth having a diameter of 25 mm was formed in the central portion.

Separately, a tin-deposited steel plate having a thickness of 0.30 mm was punched into a disc having a diameter of about 142 mm and formed into a cup having an inner diameter of about 85 mm between a drawing punch and a drawing die. Then, the cup was subjected to a re-drawing operation and ironed by an ironing punch having a diameter of about 66.1 mm and a die. An epoxy-acrylic paint was coated and baked on the outer surface of the cup in a coating amount of 70 mg/dm² by using a mandrel coater. Then an epoxy-phenol paint was spray-coated and baked on the inner surface in a coating amount of 170 mg/dm². The coated cup was subjected to a necking operation to form a lower member in which the outer diameter of the circumferential end edge was 64.40 mm.

An adhesive described below was coated on the entire circumference of the end edge of the lower member along a width of about 4 mm on the outer surface side and a width of about 2 mm on the inner surface side in the following manner. In Example 8, a film having a thickness of 60 μm, which was composed of a copolyester C comprising as the dibasic acid component terephthalic acid and adipic acid at a molar ratio of 9/1 and as the glycol component tetramethylene glycol, was applied to the end edge portion in the same manner as in Example 3. In Example 9, a copolymer nylon powder having a particle size of 21 μm, which comprised lauryl lactam and caprolamtam at a copolymerization ratio of 9/1, was coated in a thickness of 60 μm on the end edge portion in the same manner as in Example 6. In Comparative Example 4, a polyamide B obtained by polymerizing dimeric acid and polyalkylene polyamine was coated in a thickness of about 60 μm in the above-mentioned form by a hot melt applicator in the same manner as in Comparative Example 2.

The upper member and the adhesive-coated lower member were assembled at both end edges, and the assembled portion was heated by high frequency induction heating to melt the adhesive. The melt was cooled and solidified to obtain a metal bottle having a volume of about 500 ml, which was composed of the bonded upper and lower members.

Each of the so-obtained metal bottles was filled with an orange juice heated at 90° C., liquefied nitrogen was dropped into the bottle so that the inner pressure was 0.8 to 1.2 Kg/cm² when the content was cooled to room temperature, and the pouring mouth was then plugged. The denting test was carried out at 0° C. and 25° C. to evaluate the strength of the bottle. The obtained results and physical properties of the adhesives are shown in Table 4.

TABLE 4

| | Kind | Form | Adhesive Softening Point (°C.) | Post Crystallinity Wc (%) | Shear Creep Compliance J(t) t = 2 hrs (cm²/dyne) | Number Average Molecular Weight (Mn × 10⁻⁴) | $-\overset{\overset{\displaystyle O}{\|}}{C}-$ Group Concentration (meq/100 g) | Denting Test Leakage (Body Breakage) Ratio (%) 0° C. | 25° C. |
|---|---|---|---|---|---|---|---|---|---|
| Example 8 | copolyester C | film | 166 | 8 | 1.6 × 10⁻⁶ | 3.2 | 918 | 0 | 0 |
| Example 9 | nylon copolymer | powder | 170 | 14 | 3.1 × 10⁻⁶ | 2.1 | 546 | 0 | 0 |
| Compa- | polyamide | hot melt | 185 | 0 | 8.4 × 10⁻⁵ | 0.3 | 231 | 12 (8) | 4 (4) |

TABLE 4-continued

| | | | Adhesive | | | | | | |
|---|---|---|---|---|---|---|---|---|---|
| | | | | Shear Creep Compliance J(t) | Number Average |  Group | | Denting Test Leakage (Body Breakage) Ratio (%) | |
| | Kind | Form | Softening Point (°C.) | Post Crystallinity Wc (%) | t = 2 hrs (cm²/dyne) | Molecular Weight (Mn × 10⁻⁴) | Concentration (meq/ 100 g) | 0° C. | 25° C. |
| rative Example 4 | B | | | | | | | | |

What is claimed is:

1. A metal bottle adhesive for lap-bonding upper and lower members, each consisting of a cup-like formed article of a metal, on the peripheral ends thereof, said adhesive comprising at least one high-molecular-weight thermoplastic resin having a post crystallinity $\Delta Wc$, defined by the following formula, of less than 20%:

$$\Delta Wc = Wc_{II} - Wc_I$$

wherein $Wc_I$ stands for the crystallinity (%) of the adhesive which has been molten at a temperature higher by 30° C. than the softening point thereof and then naturally cooled at room temperature, determined according to the density method, and $Wc_{II}$ stands for the crystallinity of the adhesive which has then been immersed in water maintained at 70° C. for 10 hours and then naturally cooled and dried at room temperature, determined according to the density method, a shear creep compliance $J(t)_{t=2\ hrs}$ of less than $10^{-4}$ cm²/dyne at 90° C. and a time constant of 2 hours and a concentration of $$-\underset{\underset{O}{\parallel}}{C}-$$

groups, contained in the main or side chain, of 10 to 1400 meq/100 g of the resin.

2. An adhesive as set forth in claim 1, wherein the thermoplastic resin is a crystalline thermoplastic polymer having a number average molecular weight of at least 6,000.

3. An adhesive as set forth in claim 1, wherein the thermoplastic resin has a softening point of 80° to 280° C.

4. An adhesive as set forth in claim 1, wherein the thermoplastic resin is at least one copolyester.

5. An adhesive as set forth in claim 4, wherein the copolyester comprises terephthalic acid units and other dibasic acid units as the dibasic acid component and tetramethylene glycol units as the diol component.

6. An adhesive as set forth in claim 4, wherein the copolyester comprises benzene-dicarboxylic acid units as the dibasic acid component and tetramethylene glycol units and other diol units as the diol component.

7. An adhesive as set forth in claim 1, wherein the thermoplastic resin is at least one nylon containing 4 to 12 amide groups per 100 carbon atoms.

* * * * *